United States Patent
Lee et al.

(10) Patent No.: US 8,397,153 B1
(45) Date of Patent: Mar. 12, 2013

(54) SYSTEMS AND METHODS FOR RICH PRESENTATION OVERLAYS

(75) Inventors: Li-Wei Lee, New York, NY (US); Matthew Albright, Bloomfield, NJ (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/275,101

(22) Filed: Oct. 17, 2011

(51) Int. Cl.
*G06F 17/00* (2006.01)

(52) U.S. Cl. ......... 715/204; 715/209; 715/240; 715/243

(58) Field of Classification Search .................. 715/204, 715/209, 240, 243
See application file for complete search history.

(56) References Cited

U.S. PATENT DOCUMENTS

| | | |
|---|---|---|
| 5,758,358 A | 5/1998 | Ebbo |
| 5,761,669 A | 6/1998 | Montague et al. |
| 5,793,966 A | 8/1998 | Arnstein et al. |
| 6,049,664 A | 4/2000 | Dale et al. |
| 6,243,706 B1 | 6/2001 | Moreau et al. |
| 6,327,584 B1 | 12/2001 | Xian et al. |
| 6,341,305 B2 | 1/2002 | Wolfe |
| 6,377,957 B1 | 4/2002 | Jeyaraman |
| 6,418,441 B1 | 7/2002 | Call |
| 6,501,779 B1 | 12/2002 | McLaughlin et al. |
| 6,766,333 B1 * | 7/2004 | Wu et al. ............................. 1/1 |
| 7,031,954 B1 | 4/2006 | Kirsch |
| 7,035,910 B1 | 4/2006 | Dutta et al. |
| 7,263,497 B1 | 8/2007 | Wiser et al. |
| 7,437,421 B2 | 10/2008 | Bhogal et al. |
| 7,478,330 B1 | 1/2009 | Branson et al. |
| 7,491,399 B2 | 2/2009 | Vakharia |
| 7,529,778 B1 | 5/2009 | Dewey et al. |
| 7,656,543 B2 * | 2/2010 | Atkins .......................... 358/1.13 |
| 7,667,862 B2 * | 2/2010 | Ziegler et al. ................. 358/1.13 |
| 7,680,932 B2 | 3/2010 | Defaix et al. |
| 7,698,379 B2 | 4/2010 | Dutta et al. |
| 7,774,703 B2 | 8/2010 | Junuzovic et al. |
| 7,890,928 B2 | 2/2011 | Patrudu |
| 8,019,780 B1 | 9/2011 | Pinkerton et al. |
| 8,332,815 B2 * | 12/2012 | Balfe et al. .................... 717/118 |
| 2001/0037346 A1 | 11/2001 | Johnson |
| 2002/0032701 A1 | 3/2002 | Gao et al. |
| 2002/0035580 A1 | 3/2002 | Tanabe |
| 2002/0133492 A1 | 9/2002 | Goldstein et al. |

(Continued)

OTHER PUBLICATIONS

Ellis et al., "Concurrency Control in Groupware Systems," ACM 1989, pp. 399-406.

(Continued)

*Primary Examiner* — Stephen Hong
*Assistant Examiner* — Matthew Ludwig
(74) *Attorney, Agent, or Firm* — Ropes & Gray LLP (57) ABSTRACT

Systems and methods are disclosed for rendering a presentation document on a plurality of client computing devices by a server. A method includes creating a base layer for a page in the presentation document, wherein the base layer comprises a plurality of placeholder elements wherein each placeholder element has an absolute position and size. The method further includes creating an interactive layer for the page in the presentation document, wherein the interactive layer comprises a plurality of interactive element overlays representing a plurality of interactive elements and each interactive element overlay has an absolute position and size that corresponds to the absolute position and size of a placeholder element in the base layer. The method further includes sending the base layer and interactive layer of the page to each client computing device for rendering, wherein each interactive element overlay is rendered on top of its corresponding placeholder element.

27 Claims, 6 Drawing Sheets

U.S. PATENT DOCUMENTS

| | | | |
|---|---|---|---|
| 2002/0174085 A1 | 11/2002 | Nelson et al. | |
| 2002/0194302 A1 | 12/2002 | Blumberg | |
| 2003/0037076 A1 | 2/2003 | Bravery et al. | |
| 2003/0037303 A1 | 2/2003 | Bodlaender et al. | |
| 2003/0084078 A1 | 5/2003 | Torii et al. | |
| 2003/0105719 A1 | 6/2003 | Berger et al. | |
| 2004/0044965 A1 | 3/2004 | Toyama et al. | |
| 2004/0085354 A1 | 5/2004 | Massand | |
| 2004/0088653 A1 | 5/2004 | Bell et al. | |
| 2004/0133444 A1 | 7/2004 | Defaix et al. | |
| 2004/0215672 A1 | 10/2004 | Pfitzner | |
| 2004/0215825 A1 | 10/2004 | Pfitzner | |
| 2004/0215826 A1 | 10/2004 | Pfitzner | |
| 2004/0216090 A1 | 10/2004 | Kaler et al. | |
| 2005/0055337 A1 | 3/2005 | Bebo et al. | |
| 2005/0091291 A1 | 4/2005 | Kaler et al. | |
| 2005/0125461 A1 | 6/2005 | Filz | |
| 2005/0131887 A1 | 6/2005 | Rohrabaugh et al. | |
| 2005/0144256 A1 | 6/2005 | Blumberg | |
| 2005/0185636 A1 | 8/2005 | Bucher | |
| 2005/0200896 A1 | 9/2005 | Narusawa et al. | |
| 2006/0031751 A1 | 2/2006 | Ehud | |
| 2006/0075332 A1 | 4/2006 | Fairweather et al. | |
| 2006/0101071 A1 | 5/2006 | Henderson | |
| 2006/0149831 A1 | 7/2006 | Dutta et al. | |
| 2006/0200755 A1 | 9/2006 | Melmon et al. | |
| 2006/0230344 A1* | 10/2006 | Jennings et al. | 715/522 |
| 2007/0033654 A1 | 2/2007 | Wilson | |
| 2007/0061714 A1 | 3/2007 | Stuple et al. | |
| 2007/0070066 A1* | 3/2007 | Bakhash | 345/419 |
| 2007/0186157 A1 | 8/2007 | Walker et al. | |
| 2007/0208992 A1 | 9/2007 | Koren | |
| 2007/0220068 A1 | 9/2007 | Thompson et al. | |
| 2007/0288637 A1 | 12/2007 | Layton et al. | |
| 2008/0028302 A1 | 1/2008 | Meschkat | |
| 2008/0040659 A1 | 2/2008 | Doyle | |
| 2008/0059539 A1 | 3/2008 | Chin et al. | |
| 2008/0082604 A1 | 4/2008 | Mansour et al. | |
| 2008/0126943 A1 | 5/2008 | Parasnis et al. | |
| 2009/0055755 A1* | 2/2009 | Hicks et al. | 715/760 |
| 2009/0112990 A1 | 4/2009 | Campbell et al. | |
| 2009/0119572 A1 | 5/2009 | Koivunen | |
| 2009/0132907 A1* | 5/2009 | Shao et al. | 715/234 |
| 2009/0164620 A1 | 6/2009 | Ziegler et al. | |
| 2010/0005410 A1* | 1/2010 | Pang | 715/765 |
| 2010/0030578 A1 | 2/2010 | Siddique et al. | |
| 2010/0059539 A1 | 3/2010 | Giraud et al. | |
| 2010/0070852 A1* | 3/2010 | Li | 715/239 |
| 2010/0083096 A1* | 4/2010 | Dupuis-Latour et al. | 715/234 |
| 2010/0218099 A1 | 8/2010 | van Melle et al. | |
| 2010/0229086 A1 | 9/2010 | Howell et al. | |
| 2010/0235763 A1 | 9/2010 | Massand | |
| 2010/0245256 A1 | 9/2010 | Estrada et al. | |
| 2010/0251122 A1 | 9/2010 | Lee et al. | |
| 2010/0309436 A1 | 12/2010 | Allen, Jr. et al. | |
| 2011/0066957 A1 | 3/2011 | Prats et al. | |
| 2011/0085211 A1 | 4/2011 | King et al. | |
| 2011/0099093 A1 | 4/2011 | Mills | |
| 2011/0164043 A1 | 7/2011 | Arora et al. | |
| 2011/0179427 A1 | 7/2011 | Krishnamoorthy et al. | |
| 2011/0219331 A1 | 9/2011 | DeLuca et al. | |
| 2011/0282933 A1 | 11/2011 | Schmier | |
| 2012/0131483 A1* | 5/2012 | Archer et al. | 715/766 |

OTHER PUBLICATIONS

Huang et al., "A General Purpose Virtual Collaboration Room," Google 1999, pp. 1-9.

Kindberg, Mushroom: A Framework for Collaboration and Interaction across the Internet, Google 1996, pp. 1-11.

Pacull et al., Duplex: A Distributed Collaborative Editing Environment in Large Scale, ACM 1994, pp. 165-173.

Tsompanopoulou et al., "A Platform for Delivering Multimedia Presentations on Cultural Heritage," 2010 14th Panhellenic Conference on Informatics, pp. 175-179.

Non-Final Office Action dated Jan. 6, 2012 for U.S. Appl. No. 13/275,093.

Non-Final Office Action dated Jan. 11, 2012 for U.S. Appl. No. 13/274,797.

Non-Final Office Action dated Jan. 17, 2012 for U.S. Appl. No. 13/274,717.

Non-Final Office Action dated Feb. 17, 2012 for U.S. Appl. No. 13/275,123.

Non-Final Office Action dated Feb. 29, 2012 for U.S. Appl. No. 13/274,723.

Non-Final Office Action dated Dec. 30, 2011 for U.S. Appl. No. 13/274,720.

Notice of Allowance dated May 14, 2012 for U.S. Appl. No. 13/275,044.

* cited by examiner

SYSTEMS AND METHODS FOR RICH PRESENTATION OVERLAYS

FIELD OF THE DISCLOSURE

The present disclosure relates generally to rendering presentations on a computing device and in particular to rendering interactive elements in collaborative document processing systems.

BACKGROUND OF THE INVENTION

Electronic presentation documents have grown in complexity over the years. In addition to having text and images, users can now add rich media content and other interactive content such as Internet hyperlinks, audio, and video. Presentation software applications have advanced to allow the addition of a variety of content on presentation documents. However, the presentation software application must be installed on each computing device in order for a user to view or edit the presentation on that device.

Recently, online document processing applications have been developed which make it possible for people to create word processing, spreadsheets and presentation documents without having specific document processing software specially installed on their computing device. These online applications provide access to the document processing features through an Internet browser. The actual documents are stored on the application server, but may be downloaded locally to a client computing device. Because the documents are stored centrally and are accessed via an Internet browser, it is possible for multiple people to view, edit, and share the document regardless of the hardware and software capabilities of the computing device they are using.

Online document processing applications are usually compatible with a variety of Internet browsers available in the consumer market. However, each browser is programmed differently which can result in differences in appearance of the same content in different browsers. Furthermore, some browsers may not be able to support more advanced presentation features such as video. For example, more modern browsers use scalable vector graphics (SVG) to implement basic presentation features such as text, images, and animations. Modern browsers usually also have the capability of embedding HTML features into SVG. Older browsers may render presentation features differently, for example through the use of portable network graphics (PNG). Neither SVG nor PNG are capable of embedding videos into the presentation.

SUMMARY OF THE INVENTION

Given the wide variance in Internet browsers, it is preferable to develop systems and methods to edit and view interactive elements in online presentation documents that are browser-independent. Systems and methods are disclosed herein for rendering a presentation document on a client computing device by a server. In one aspect, a computerized method includes creating a base layer for a page in the presentation document, wherein the base layer includes a plurality of placeholder elements and wherein each placeholder element has an absolute position and size. The method further includes creating an interactive layer for the page, wherein the interactive layer includes a plurality of interactive element overlays representing a plurality of interactive elements, and wherein each interactive element overlay has an absolute position and size that corresponds to the absolute position and size of a placeholder element in the base layer. The method further includes sending the base layer and interactive layer to the client computing device for rendering, wherein each interactive element overlay is rendered on top of its corresponding placeholder element.

In another aspect, a computerized method for displaying a presentation document on a plurality of client computing devices is disclosed. The method includes creating a base layer for a page in the presentation document, wherein the base layer includes a plurality of placeholder elements and wherein each placeholder element has an absolute position and size. The method further includes creating an interactive layer for the page in the presentation document, wherein the interactive layer includes a plurality of interactive element overlays representing a plurality of interactive elements, and wherein each interactive element overlay has an absolute position and size that corresponds to the absolute position and size of a placeholder element in the base layer. The method further includes sending the base layer and interactive layer of the page in the presentation document to each client computing device for rendering, wherein each interactive element overlay is rendered on top of its corresponding placeholder element.

In another aspect, a system for displaying a presentation document on a plurality of client computing devices is disclosed. The system includes a server configured to create a base layer for each page in the presentation document, wherein each base layer includes a plurality of placeholder elements and wherein each placeholder element has an absolute position and size. The server is further configured to create an interactive layer for each page in the presentation document, wherein the interactive layer includes a plurality of interactive element overlays representing a plurality of interactive elements, and wherein each interactive element overlay has an absolute position and size that corresponds to the absolute position and size of a placeholder element in the base layer. The server is further configured to send the base layer and interactive layer of each page of the presentation document to each client computing device for rendering, wherein each interactive element overlay is rendered on top of its corresponding placeholder element.

In another aspect, a computerized method of editing a presentation document on a client computing device where the presentation document is stored on a server is disclosed. The method includes defining a plurality of interactive element overlays to be placed on the page, wherein the plurality of interactive element overlays represents a plurality of interactive elements, and placing a plurality of placeholder elements corresponding to the plurality of interactive element overlays on the page.

BRIEF DESCRIPTION OF THE FIGURES

The methods and systems may be better understood from the following illustrative description with reference to the following drawings in which.

DETAILED DESCRIPTION

To provide an overall understanding of the invention, certain illustrative embodiments will now be described, including systems and methods for displaying a document on a plurality of client computing devices by a server. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof.

Figure 1:
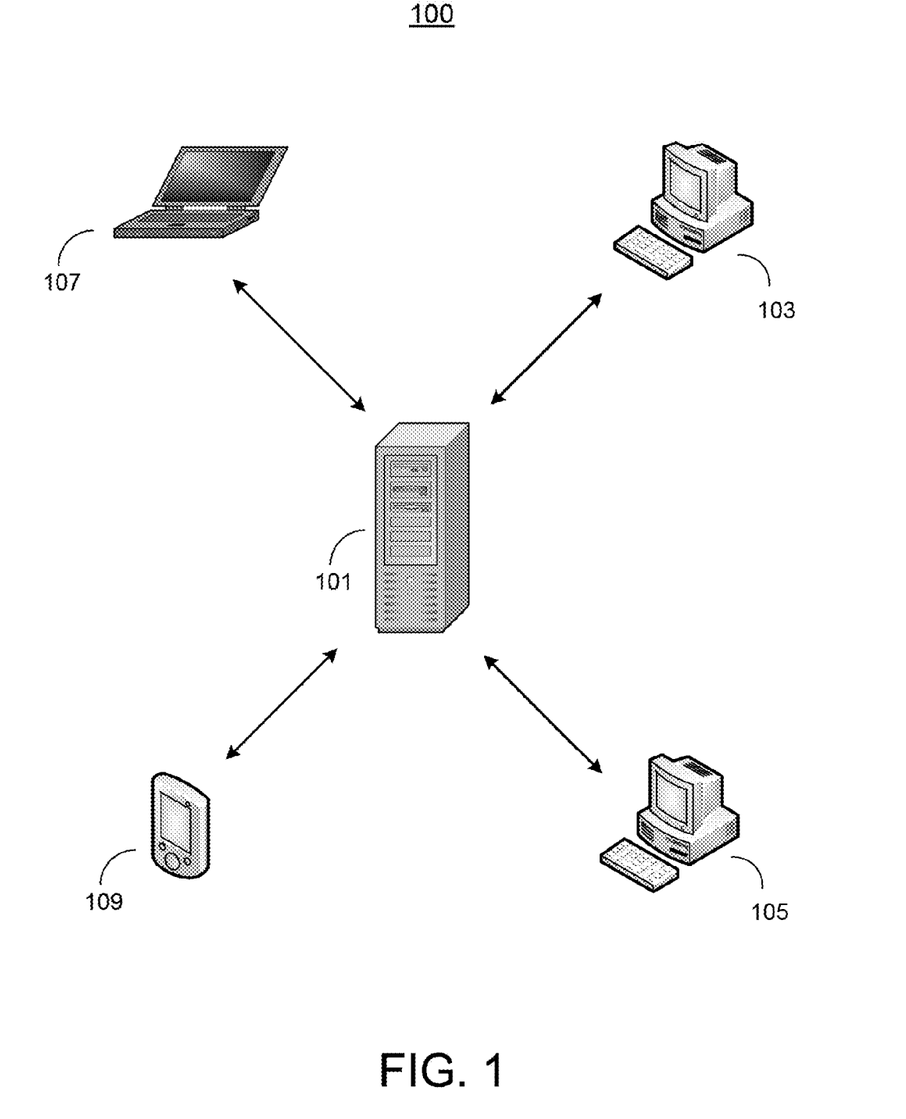
FIG. 1 is a client-server system in accordance with an embodiment of the invention.

FIG. 1 depicts a client-server system for viewing presentation documents. Client-server system 100 includes a server 101 and multiple client computing devices 103 through 109. These client computing devices may include desktop computers like devices 103 and 105, laptop computers like device 107, and handheld electronic devices like device 109. Computing devices that can be used in client-server system 100 are not limited to the devices depicted in FIG. 1 and can encompass a wide variety of devices. Each computing device can communicate with server 101. The devices can communicate with the server through a local area network (LAN), wide area network (WAN), an Internet connection, or any other form of electronic communication. Each computing device in system 100 has an Internet browser installed on it. Internet browsers allow computing devices to view web pages on the Internet. Examples of Internet browsers are Google Chrome, Microsoft Internet Explorer and Mozilla Firefox, but the types of Internet browsers contemplated are not limited to the ones listed. Server 101 can store documents that can be accessed by any computing device in system 100. Such documents may include presentations. One or more users can access the server 101 through the computing devices to view and edit documents or share documents with other users. Server 101 controls the rendering of presentation documents on the computing devices to ensure uniform appearance and functionality regardless of the specific hardware or software capabilities of the computing devices. Although illustrated as a single device in FIG. 1, server 101 may be implemented as, for example, a single computing device or as multiple distributed computing devices.

Figure 2:
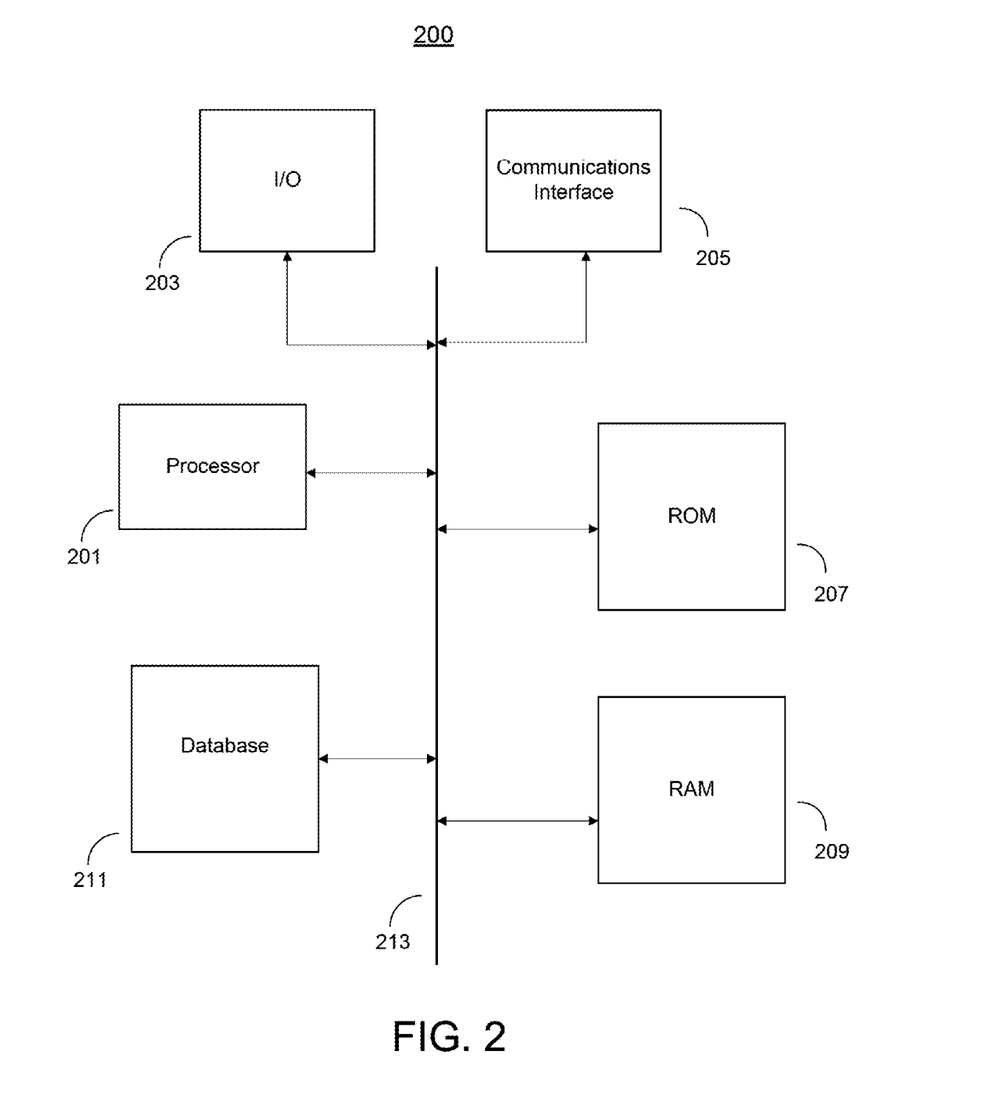
FIG. 2 is a server component diagram in accordance with an embodiment of the invention.

The server in client-server system 100 will now be discussed in greater detail. FIG. 2 depicts a server 200 which includes a processor 201, input and output devices 203, a communications interface 205, read-only memory (ROM) 207, random access memory (RAM) 209, database 211, and bus 213. The bus 213 enables every component in server 200 to electronically communicate with each other. Input/output devices 203 may include a keyboard, mouse, display screen, touchpad, speakers, or any other compatible input or output device. Communications interface 205 may be a network connection, Internet connection, or any other type of electronic communication component. In one embodiment, the communications interface 205 can communicate with multiple client computing devices, such as desktop computers, laptops, and handheld devices. Database 211 can store electronic documents that can be accessed by clients through communications interface 205.

Processor 201 may be configured to perform tasks such as sending electronic documents stored in database 211 to multiple client computing devices using communications interface 205, receiving edits to electronic documents stored in database 211 from client computing devices, and generating presentation rendering information to be displayed on client computing devices. Processor 201 may be configured to ensure that presentation documents stored in database 211 and distributed to different computing devices will all be enabled to view interactive elements within the presentation document.

Processors suitable for the execution of a computer program include, by way of example, both general and special purpose microprocessors, and any one or more processors of any kind of digital computer. Generally, a processor will receive instructions and data from RAM or ROM or both. The essential elements of a computer are a processor for performing instructions and one or more memory devices for storing instructions and data. Computer-readable media suitable for storing computer program instructions and data, such as database 211, include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Methods of editing and rendering presentation documents on an online document processing application will now be discussed. A presentation document usually has a number of pages, each page holding a variety of content. This content could be static, as in text, images and background, but may also be interactive. Interactive elements in a presentation may include but are not limited to audio, video, data displays, interactive charts, applets, games, editable forms and hyperlinks. In some embodiments, an interactive element may be any content that an user can view, listen, or dynamically interact with through a mouse click, keyboard input, cursor scroll, or any other input.

When rendering an online presentation document stored on an Internet browser, problems may occur displaying the interactive elements because of differences in how different browsers operate. For example, a browser may not be able to render an interactive element properly and thus it will not be displayed properly to a viewer of the presentation. This may be solved by separating each page in the presentation document into two layers at the time of rendering, the base layer and the interactive layer. The server uses placeholder elements to represent interactive elements on the base layer and uses interactive element overlays to represent interactive elements on the interactive layer. When rendered in such a fashion, the interactive elements should appear properly regardless of the browser used by the viewer of the presentation.

Figure 3A:
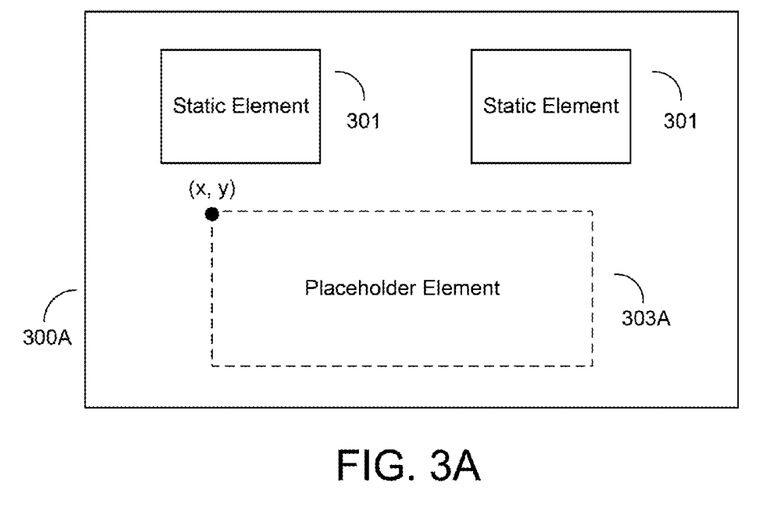
FIGS. 3A and 3B are illustrations of the base layer and interactive layer of a page in a presentation document in accordance with an embodiment of the invention.

In order to render a presentation document in two layers, placeholder elements are generated during the editing process. When editing a presentation document, the static elements can be placed directly on the page. The interactive elements of the page can be represented by placeholder elements. FIG. 3A depicts an example of a presentation page 300A with static elements 301 and placeholder element 303A. The number of static and placeholder elements and their placement can vary and are not limited to what is illustrated in FIG. 3A.

Placeholder element 303A has a specific placement on the page, as illustrated by the (x, y) coordinates of the top left corner of the placeholder element in FIG. 3A. Placeholder element 303A also has a specific width and height. The size and position of placeholder element 303A correspond exactly to the size and position of the interactive element that will be on the presentation page. A user can change the size and position of the placeholder element while editing the presentation page. Placeholder element 303A contains information regarding the interactive element it represents. For example, if the interactive element is a video, the placeholder element may contain information about the content source of the video and an ID referring to a specific piece of content. If the interactive element is a hyperlink, the placeholder element may be a piece of text or an image that represents the hyperlink, as well as the hyperlink address. Placeholder elements can be stacked or overlapped in a specific order on the presentation page. Also, placeholder elements can be placed on the workspace outside the bounds of the presentation page—these would not be visible in the actual presentation.

Figure 3B:
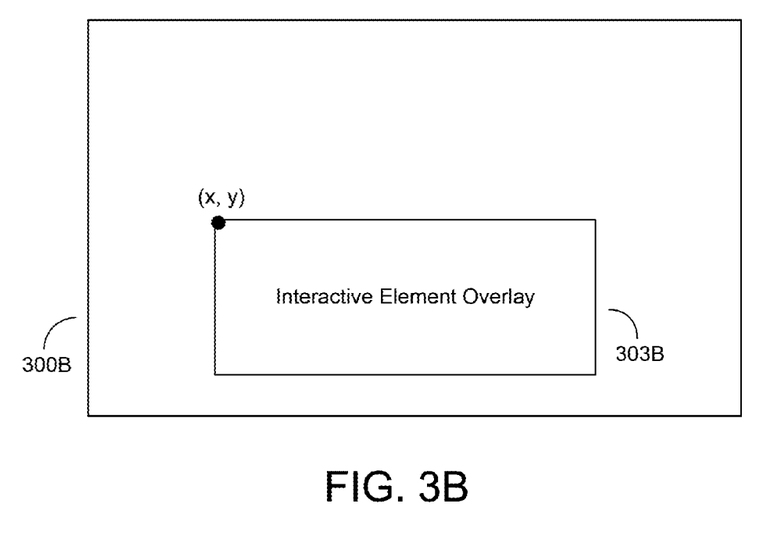

When rendering a presentation page for display within an Internet browser on a computing device, the server creates two layers for each page in the presentation. The first layer is the base layer, which contains the static elements and placeholder elements representing any interactive elements on the page. The second layer is the interactive layer, which represents the interactive elements. FIGS. 3A and 3B depict a base layer 300A and an interactive layer 300B for a single page in a presentation document. Base layer 300A may have the same appearance as the presentation page during editing of the page, i.e. it contains the static and placeholder elements. In some embodiments, the base layer is represented as one or more SVG or PNG image files. In some embodiments, the base layer may be represented by a number of image formats, including JPEG, GIF and TIFF. For interactive layer 300B, the server finds all the placeholder elements in the page that have interactive content. For each of these placeholder elements, a JavaScript Object Notation (JSON) object is created for each interactive element, as illustrated as interactive element overlay 303B in FIG. 3B. The interactive element overlay has size and position properties that precisely match the interactive element and its corresponding placeholder element 303A in FIG. 3A. If there are multiple overlapping interactive elements on a presentation page, the interactive element overlays created by the server will list the overlays in the order in which they are stacked. Interactive layer 300B is a collection of these interactive element overlays.

Once the server has created both the base layer and the interactive layer, the server sends both layers to the computing device for rendering. First, the computing device renders the base layer, which may be a PNG, JPEG, GIF, TIFF or SVG image. The base layer contains the static and placeholder elements, as illustrated in FIG. 3A. The computing device then renders the interactive layer, illustrated in FIG. 3B, on top of the base layer so that any interactive element overlays 303B are directly on top of its corresponding placeholder elements 303A. All interactive elements are rendered in such a manner that the viewer perceives the placeholder element, interactive element overlay, and interactive element as a single object. For example, if the interactive element is a video, the interactive element overlay would completely hide the placeholder element so that it cannot be seen during the presentation. A user can interact with the video as normal, for example using the mouse or keyboard controls to play the video. If the interactive element is a hyperlink, the interactive element overlay would be a transparent and/or invisible DIV element over the placeholder element. A DIV element is a HTML tag that denotes non-standard presentation or behavior within a HTML document. The user sees the placeholder element, which may be text or an image that represents the hyperlink, but when the user tries to click on the placeholder element the DIV element intercepts the click and directs the user's Internet browser to load the hyperlink.

Figure 4:
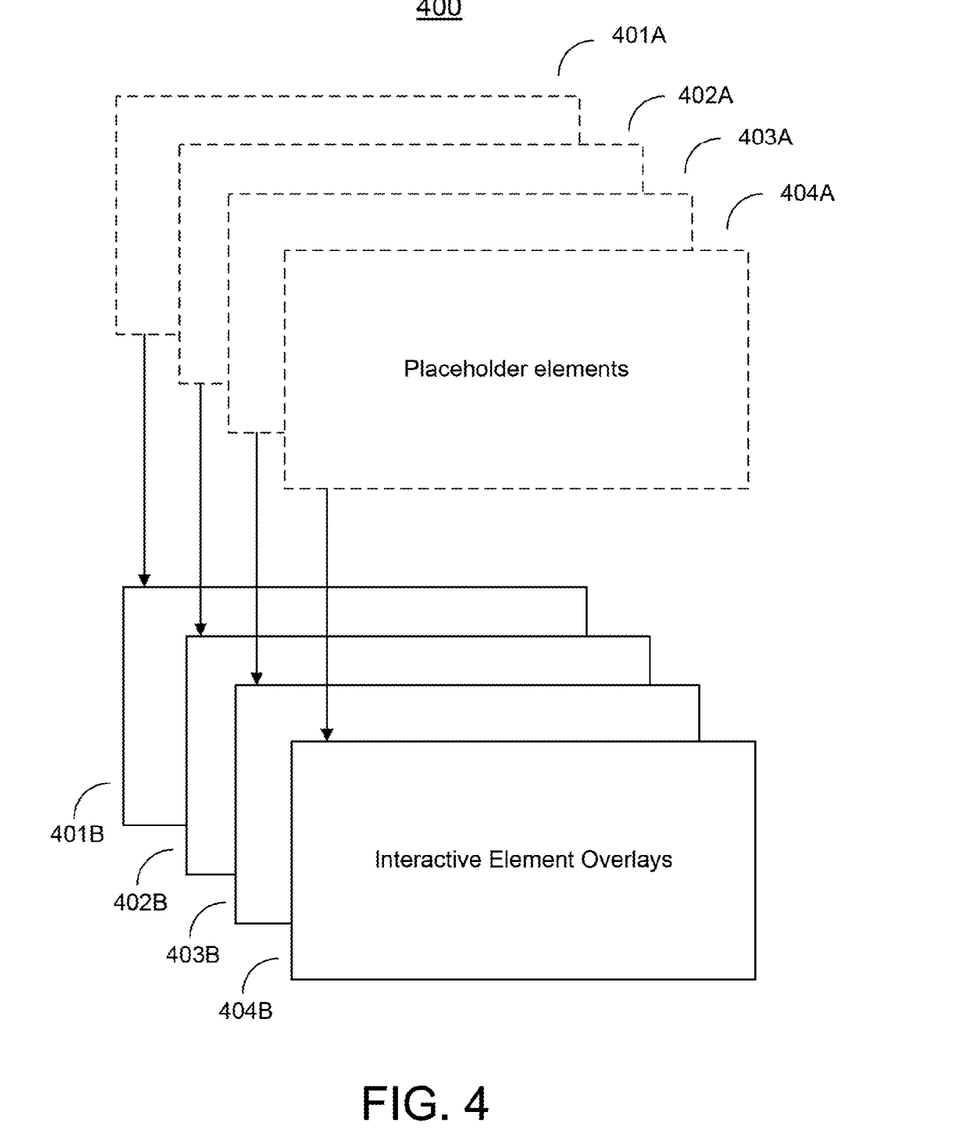
FIG. 4 is a diagram showing the overlay of placeholder elements and interactive elements in accordance with an embodiment of the invention.

If a presentation page has overlapping stacked interactive elements, then the placeholder elements in the base layer and their corresponding interactive element overlays in the interactive layer are stacked in the same position and order. This is illustrated in FIG. 4. Placeholder elements 401A through 404A are stacked in a particular order and position in the base layer, with placeholder element 401A at the bottom of the stack and placeholder element 404A at the top of the stack. In the interactive layer, the interactive element overlays 401A through 404A are kept in exactly the same position and order as their corresponding placeholder elements. This ensures that the presentation page is rendered exactly as the user specifies.

While viewing a presentation document on an Internet browser, a user can resize the browser window. If this occurs, the presentation page that is being viewed must also be resized to fit the new size of the browser. This involves resizing both the base layer and the interactive layer of the presentation page. Resizing the base layer is fairly simple. For example, if the base layer is a SVG or PNG image, then the image can simply be scaled proportionately to the resized browser window. Resizing the interactive layer is slightly more complicated because the interactive element overlays are positioned according to absolute coordinates to match with corresponding placeholder elements. In some embodiments, the server waits for a browser resizing event. When the server detects a resize event, it calculates the new overall size of the presentation page. By comparing the new size to the original size of the page, the server can calculate a new position and size for each interactive element overlay. Once that is completed, the resized base and interactive layers can be rendered on the computing device.

Figure 5:
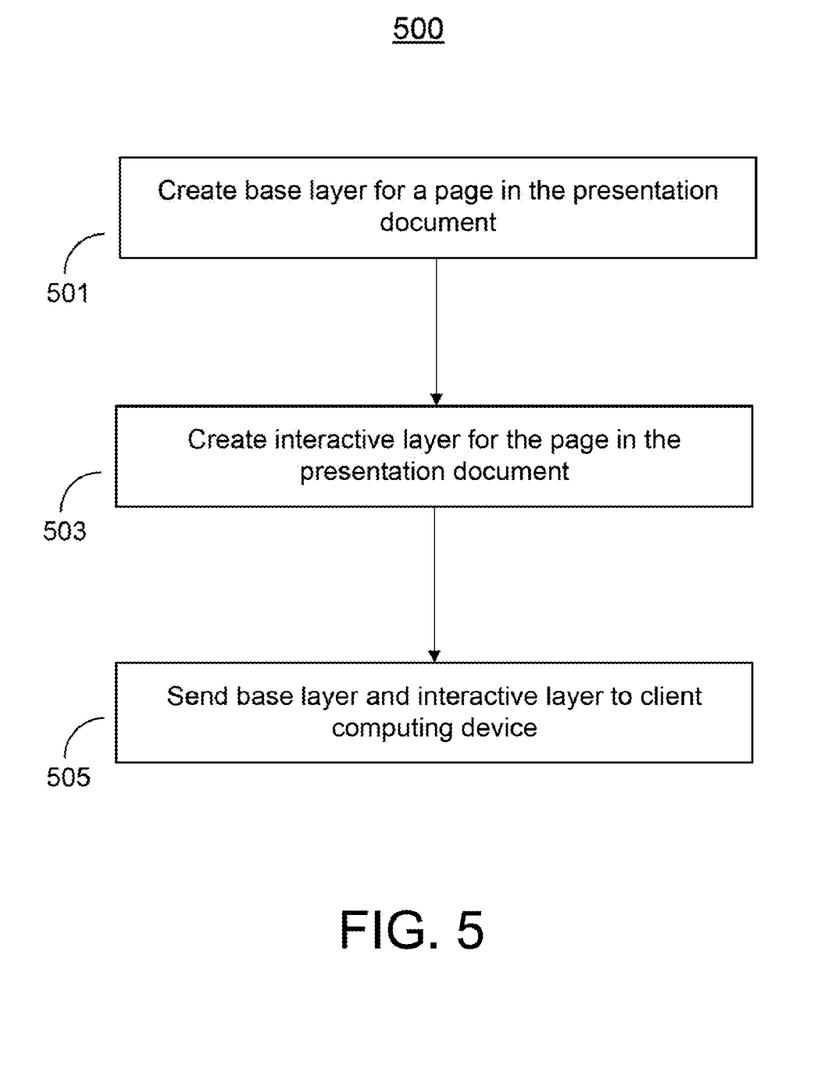
FIG. 5 is a flow chart showing a method for rendering a presentation document on a client computing device by a server in accordance with an embodiment of the invention.

Methods of operation of the server in the client-server system are now discussed. FIG. 5 is a flow chart depicting a method 500 for rendering a presentation document on a client computing device by a server. Method 500 includes the server first creating a base layer for a page in the presentation document, the base layer having a plurality of static elements and placeholder elements. Next, the server creates an interactive layer for the page, where the interactive layer includes a plurality of interactive element overlays representing a plurality of interactive elements. The base layer and interactive layer are sent from the server to the client device for rendering, where each interactive element overlay is rendered on top of its corresponding placeholder element. Static elements may include, for example, text and images and interactive elements may include, for example, video, audio, interactive charts, applets, data displays, games, editable forms and hyperlinks.

The first step in rendering a presentation page is for the server to create a base layer for a page in the presentation document, shown as step 501 in FIG. 5. The base layer may have a number of static elements and a number of placeholder elements for the interactive elements on the page. An example of a base layer is shown in FIG. 3A. Each placeholder element has a defined absolute position and size. The absolute position can be described using an (x, y) coordinate notation and the size can be described using width and height measurements. In some embodiments, the base layer is represented as one or more SVG, JPEG, GIF, TIFF or PNG images. In some embodiments, the placeholder elements are stacked in a particular order, corresponding to a stacking of the interactive elements in the presentation page.

After the base layer is created, the server creates an interactive layer for the presentation page, shown as step 503 in FIG. 5. The interactive layer contains a plurality of interactive element overlays. Each interactive element overlay represents an interactive element on the presentation page. Each interactive element overlay also corresponds to a placeholder element on the base layer and has an absolute size and position that is equal to the absolute size and position of its corresponding placeholder element. In some embodiments, the interactive element overlays are created using JSON. In some embodiments, the interactive element overlays are stacked in a particular order, corresponding to a stacking of the interactive elements in the presentation page.

After both the base layer and interactive layer have been created, the server sends the base layer and interactive layer to the client computing device, shown as step 505 in FIG. 5. At the client computing device, both layers are rendered. The base layer is rendered first and the interactive layer is rendered on top of the base layer. The interactive layer is rendered such that each interactive element overlay is rendered directly on top of its corresponding placeholder element in the base layer. When rendered in such a manner, a viewer of the presentation page would perceive the interactive element, interactive element overlay, and placeholder element as one object. Thus each page in the presentation document can be rendered on a client computing device using method 500.

Figure 6:
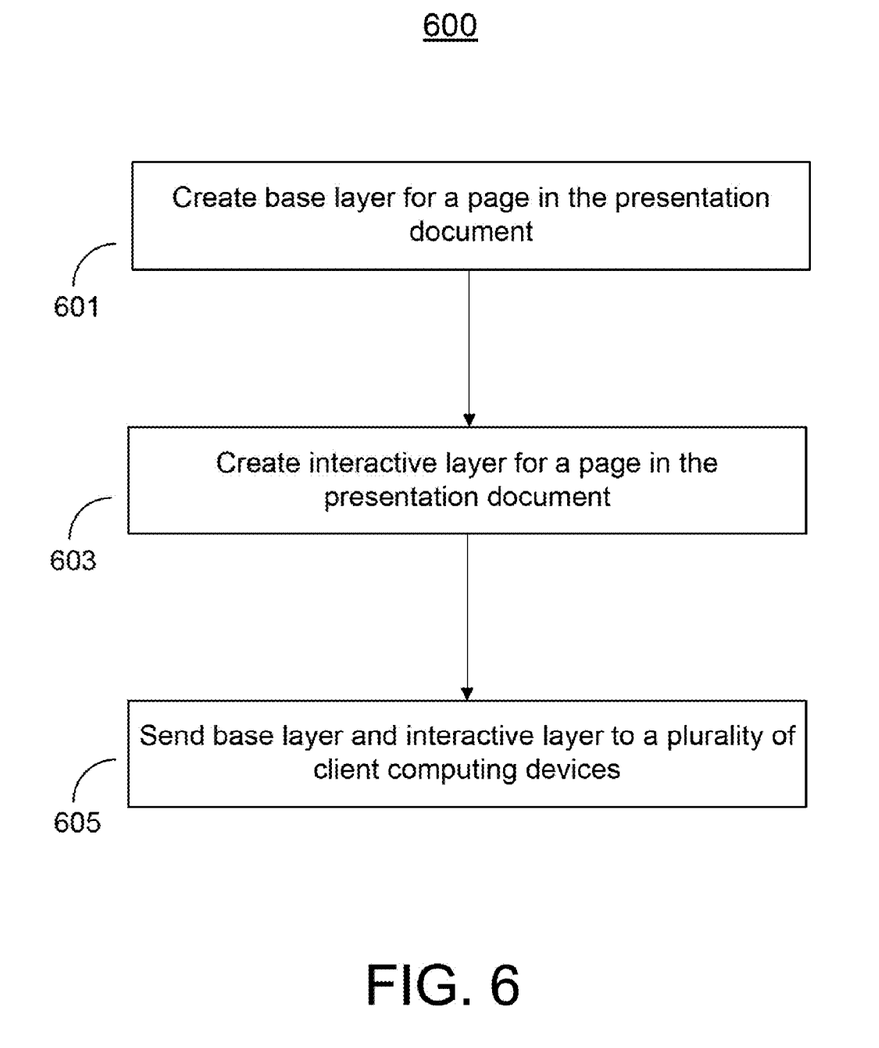
FIG. 6 is a flow chart showing a method for displaying a presentation document on a plurality of client computing devices in accordance with an embodiment of the invention.

Next, methods of rendering presentation documents on multiple computing devices using a server are discussed. FIG. 6 is a flow chart depicting a method 600 of displaying a presentation document on a plurality of client computing devices by a server. Method 600 includes the server creating a base layer for a page in the presentation document. The base layer includes static elements and placeholder elements representing interactive elements. The server then creates an interactive layer for the same page in the presentation document. The interactive layer includes interactive element overlays that represent interactive elements. The server sends the base layer and the interactive layer of the page of the presentation document to each client computing device for rendering. Static elements may include, for example, text and images and interactive elements may include, for example, video, audio, interactive charts, applets, data displays, games, editable forms and hyperlinks.

The first step in rendering the presentation document is for the server to create a base layer for a page in the presentation document, shown as step 601 in FIG. 6. The base layer may have a number of static elements and a number of placeholder elements for the interactive elements on the page. An example of a base layer is shown in FIG. 3A. Each placeholder element has a defined absolute position and size. The absolute position can be described using an (x, y) coordinate notation and the size can be described using width and height measurements. In some embodiments, the base layer is represented as one or more SVG, JPEG, GIF, TIFF or PNG images. In some embodiments, the placeholder elements are stacked in a particular order, corresponding to a stacking of the interactive elements in the presentation page.

After the base layer is created, the server creates an interactive layer for the page in the presentation document, shown as step 603 in FIG. 6. The interactive layer contains a plurality of interactive element overlays. Each interactive element overlay represents an interactive element on the presentation page. Each interactive element overlay also corresponds to a placeholder element on the base layer and has an absolute size and position that is equal to the absolute size and position of its corresponding placeholder element. In some embodiments, the interactive element overlays are created using JSON. In some embodiments, the interactive element overlays are stacked in a particular order, corresponding to a stacking of the interactive elements in the presentation page.

After both the base layer and interactive layer have been created for the presentation page, the server sends the base layer and interactive layer to a plurality of client computing devices, shown as step 605 in FIG. 6. At each of the client computing devices, both layers are rendered. The base layer is rendered first and the interactive layer is rendered on top of the base layer. The interactive layer is rendered such that each interactive element overlay is rendered directly on top of its corresponding placeholder element in the base layer. When rendered in such a manner, a viewer of the presentation page would perceive the interactive element, interactive element overlay, and placeholder element as one object. Thus each page in the presentation document can be rendered on multiple client computing devices using method 600.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Further, certain portions of the invention may be implemented as "logic" or a "component" that performs one or more functions. This logic may include hardware, such as an application specific integrated circuit or a field programmable gate array, software, or a combination of hardware and software.

What is claimed is:

1. A computerized method for rendering a presentation document on a client computing device using a server, the method comprising:
   creating, at the server, a base layer for a page in the presentation document, wherein the base layer comprises a plurality of placeholder elements and wherein each placeholder element has an absolute position and size;
   creating, at the server, an interactive layer for the page, wherein the interactive layer comprises a plurality of interactive element overlays representing a plurality of interactive elements, and wherein the server sets an absolute position and size of each interactive element overlay to equal the absolute position and size of a placeholder element in the base layer; and
   sending the base layer and interactive layer from the server to the client computing device for rendering, wherein each interactive element overlay is rendered directly on top of its corresponding placeholder element.

2. The method of claim 1, wherein the base layer also comprises a plurality of static elements.

3. The method of claim 1, wherein the base layer is a scalable vector graphic image.

4. The method of claim 1, wherein the absolute position and size of the plurality of interactive element overlays is defined using JavaScript Object Notation.

5. The method of claim 1, wherein one or more of the interactive element overlays and their corresponding placeholder elements overlap, and wherein the interactive element overlays on the bottom are rendered first.

6. The method of claim 1, wherein if the page is resized, the base layer and the plurality of placeholder elements are resized proportionally with the page so that each placeholder element has a new absolute position and size, and wherein the absolute position and size for each interactive element overlay is modified to equal the new absolute position and size of its corresponding resized placeholder element.

7. The method of claim 1, wherein each absolute position of the plurality of placeholder elements and interactive element overlays comprises a two dimensional coordinate.

8. The method of claim 1, wherein each size of the plurality of placeholder elements and interactive element overlays comprises a width and a height.

9. A computerized method for displaying a presentation document on a plurality of client computing devices using a server, the method comprising:
 creating, at the server, a base layer for a page in the presentation document, wherein the base layer comprises a plurality of placeholder elements and wherein each placeholder element has an absolute position and size;
 creating, at the server, an interactive layer for the page in the presentation document, wherein the interactive layer comprises a plurality of interactive element overlays representing a plurality of interactive elements, and wherein the server sets an absolute position and size of each interactive element overlay to equal the absolute position and size of a placeholder element in the base layer; and
 sending the base layer and interactive layer of the page in the presentation document from the server to each client computing device for rendering, wherein each interactive element overlay is rendered directly on top of its corresponding placeholder element such that the page has an uniform appearance when rendered on each client computing device.

10. The method of claim 9, wherein the base layer also comprises a plurality of static elements.

11. The method of claim 9, wherein the base layer is a scalable vector graphic image.

12. The method of claim 9, wherein the absolute position and size of the plurality of interactive element overlays is defined using JavaScript Object Notation.

13. The method of claim 9, wherein one or more of the interactive element overlays and their corresponding placeholder elements overlap, and wherein the interactive element overlays on the bottom are rendered first.

14. The method of claim 9, wherein if the page is resized, the base layer and the plurality of placeholder elements are resized proportionally with the page so that each placeholder element has a new absolute position and size, and wherein the absolute position and size for each interactive element overlay is modified to equal the new absolute position and size of its corresponding resized placeholder element.

15. The method of claim 9, wherein each absolute position of the plurality of placeholder elements and interactive element overlays comprises a two dimensional coordinate.

16. The method of claim 9, wherein each size of the plurality of placeholder elements and interactive element overlays comprises a width and a height.

17. A system for displaying a presentation document on a plurality of client computing devices, the system comprising:
 a server configured to:
  create a base layer for each page in the presentation document, wherein each base layer comprises a plurality of placeholder elements and wherein each placeholder element has an absolute position and size;
  create an interactive layer for each page in the presentation document, wherein the interactive layer comprises a plurality of interactive element overlays representing a plurality of interactive elements, and wherein the server sets an absolute position and size of each interactive element overlay to equal the absolute position and size of a placeholder element in the base layer; and
  send the base layer and interactive layer of each page of the presentation document to each client computing device for rendering, wherein each interactive element overlay is rendered directly on top of its corresponding placeholder element such that the page has a uniform appearance when rendered on each client computing device.

18. The system of claim 17, wherein the base layer also comprises a plurality of static elements.

19. The system of claim 17, wherein the base layer is a scalable vector graphic image.

20. The system of claim 17, wherein the absolute position and size of the plurality of interactive element overlays is defined using JavaScript Object Notation.

21. The system of claim 17, wherein one or more of the interactive element overlays and their corresponding placeholder elements overlap, and wherein the interactive elements on the bottom are rendered first.

22. The system of claim 17, wherein if the page is resized, the base layer and the plurality of placeholder elements are resized proportionally with the page so that each placeholder element has a new absolute position and size, and wherein the absolute position and size for each interactive element overlay is modified to equal the new absolute position and size of its corresponding resized placeholder element.

23. A computerized method of editing a presentation document on a client computing device where the presentation document is stored on a server, the method comprising:
 receiving, from the server, a plurality of interactive element overlays to be placed on the page, wherein the plurality of interactive element overlays represents a plurality of interactive elements and wherein the server defines an absolute position and size for each interactive element overlay;
 receiving, from the server, a plurality of placeholder elements corresponding to the plurality of interactive element overlays on the page, wherein the server defines an absolute position and size for each placeholder element that equals the absolute position and size of the corresponding interactive element overlay; and
 rendering, at the client computing device, each interactive element overlay directly on top of its corresponding placeholder element.

24. The method of claim 23, wherein receiving, from a server, a plurality of interactive element overlays comprises receiving the absolute position, size, and content of each interactive element overlay.

25. The method of claim 23, wherein the method further comprises receiving, from the server, a plurality of static elements on the page.

26. The method of claim 23, wherein the absolute position and size of the plurality of interactive element overlays is defined using JavaScript Object Notation.

27. The method of claim 23, wherein one or more of the interactive element overlays and their corresponding placeholder elements overlap.

* * * * *